(12) United States Patent
Jeong et al.

(10) Patent No.: US 7,770,451 B2
(45) Date of Patent: Aug. 10, 2010

(54) ANGULAR VELOCITY DETECTING DEVICE

(75) Inventors: Heewon Jeong, Tokyo (JP); Yasushi Goto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 73 days.

(21) Appl. No.: 12/136,759

(22) Filed: Jun. 10, 2008

(65) Prior Publication Data
US 2009/0056444 A1 Mar. 5, 2009

(30) Foreign Application Priority Data
Jun. 22, 2007 (JP) ............................. 2007-164975

(51) Int. Cl.
G01P 15/08 (2006.01)
(52) U.S. Cl. ............... 73/504.14; 73/504.02; 73/514.02
(58) Field of Classification Search ............. 73/504.01, 73/504.02, 504.03, 504.04, 504.12, 514.01, 73/514.02, 514.38, 504.14
See application file for complete search history.

(56) References Cited

U.S. PATENT DOCUMENTS

| 5,889,208 | A | * | 3/1999 | Nose | 73/504.16 |
| 5,945,599 | A | * | 8/1999 | Fujiyoshi et al. | 73/504.12 |
| 5,952,572 | A | * | 9/1999 | Yamashita et al. | 73/504.04 |
| 6,044,707 | A | * | 4/2000 | Kato | 73/504.14 |
| 6,158,280 | A | * | 12/2000 | Nonomura et al. | 73/504.04 |
| 6,240,780 | B1 | * | 6/2001 | Negoro et al. | 73/504.12 |
| 6,308,568 | B1 | * | 10/2001 | Moriya | 73/504.13 |
| 6,378,369 | B1 | * | 4/2002 | Takata et al. | 73/504.14 |
| 6,508,123 | B2 | * | 1/2003 | Hasegawa et al. | 73/504.12 |
| 6,739,191 | B2 | * | 5/2004 | Moriya et al. | 73/504.14 |
| 7,093,487 | B2 | * | 8/2006 | Mochida | 73/504.14 |
| 7,318,348 | B2 | * | 1/2008 | Ogino | 73/504.14 |
| 2001/0004847 | A1 | * | 6/2001 | Moriya et al. | 73/504.12 |
| 2001/0008088 | A1 | * | 7/2001 | Hasegawa et al. | 73/504.12 |
| 2005/0066726 | A1 | * | 3/2005 | Mochida | 73/504.14 |
| 2006/0042383 | A1 | * | 3/2006 | Ogino et al. | 73/504.12 |

FOREIGN PATENT DOCUMENTS

| JP | 08184448 | A | * | 7/1996 |
| JP | 11064001 | A | * | 3/1999 |
| JP | 11173856 | A | * | 7/1999 |
| JP | 2000-180174 | A | | 6/2000 |

* cited by examiner

*Primary Examiner*—Hezron Williams
*Assistant Examiner*—Samir M Shah
(74) *Attorney, Agent, or Firm*—Miles & Stockbridge P.C.

(57) ABSTRACT

A high-performance angular rate detecting device is provided. A driving part including a drive frame and a Coriolis frame is levitated by at least two fixing beams which share a fixed end and are extending in a direction orthogonal to a driving direction, thereby vibrating the driving part. Even when a substrate is deformed by mounting or heat fluctuation, internal stress generated to the fixed beam and a supporting beam is small, thereby maintaining a vibrating state such as resonance frequency and vibration amplitude constant. Therefore, a high-performance angular rate detecting device which is robust to changes in mounting environment can be obtained.

10 Claims, 9 Drawing Sheets

ANGULAR VELOCITY DETECTING DEVICE

CROSS-REFERENCE TO RELATED APPLICATION

The present application claims priority from Japanese Patent Application No. JP 2007-164975 filed on Jun. 22, 2007, the content of which is hereby incorporated by reference into this application.

TECHNICAL FIELD OF THE INVENTION

The present invention relates to a Micro-Electro-Mechanical Systems (MEMS) formed by a semiconductor microfabrication technology which measures angular rate (velocity) by detecting a physical quantity relating to the Coriolis force generated to a vibrating member.

BACKGROUND OF THE INVENTION

As a conventional technology, a known angular velocity (rate) detecting device disclosed by the Specification of U.S. Pat. No. 5,945,599 (Patent Document 1) has an exciter (drive frame) supported by using a plurality of supporting beams and fixed beams extending outward the exciter in a detecting direction orthogonal to an exciting direction and holding the exciter. Since the supporting beam and the fixed beam are flexible in the exciting direction and rigid in the detecting direction, they are capable of making the exciter easy to move in the exciting direction and hard to move in the detecting direction. And, the Coriolis component is coupled with the exciter by a beam flexible in the detecting direction and rigid in the exciting direction. Therefore, the Coriolis component vibrates together with the exciter following the movement of the exciter in the exciting direction.

When an angular velocity is applied about an axis orthogonal to the exciting direction and the detecting direction in this state, the Coriolis force proportional to the angular velocity applied in the detecting direction that is orthogonal to the exciting direction is applied to the vibrating exciter and the Coriolis component. Meanwhile, since the exciter is formed to be hard to move in the detecting direction, only the Coriolis component is displaced in the detecting direction. By detecting the displacement of the Coriolis component or the Coriolis force, the angular velocity can be detected.

However, in the case where a vibrating body is supported by holding the exciter, a distance between support points tends to be long, and thus when strain by mounting and strain by heat of a substrate supporting the vibrating body are generated, elastic stress is generated onto the fixed beam and the supporting beam to change the spring constant of the beam largely, thereby deteriorating the performance of angular velocity detection.

A known angular velocity detecting device disclosed by the Specification of Japanese Patent Application Laid-Open Publication No. 2000-180174 (Patent Document 2) has four exciting components (drive frame) which are also Coriolis components arranged radially and fixed to a supporting substrate (basement layer) symmetrically about a center point. Therefore, even when strain by mounting and deformation of substrate by heat are generated, no elastic stress is generated onto the supporting beam and the fixed beam, thereby maintaining the essential performance.

However, there is a limitation in the shape to be symmetrical about a center point, and accordingly, electrodes should be provided far because the space for providing electrodes is narrower close to the center point, and bad usability of space, and thus it is not suitable to make small. Further, since the support and fixation are made at only the center point, it is easy to pose deflection by the structure's own weight, and weak in disturbance because it easily vibrates outward of the substrate surface. In the case where an active layer is thin (e.g., 4 μm), a suspension structure formed on the active layer and the supporting substrate at the stage of manufacture possibly be stuck, which poses yield reduction.

SUMMARY OF THE INVENTION

In the angular detecting device of Patent Document 1, as described above, the vibrating body is supported by holding the exciter, and thus a distance between supporting points are long, and when strain by mounting and strain by variation in peripheral environment such as heat are generated on the supporting substrate in this state, the distance between fixing points of the fixed beam is fluctuated, which generates stress inside the fixed beam and the supporting beam. Due to the internal stress, the spring constant of the beams is changed so that a resonant frequency of the supported vibrating body is changed. The change over time of the resonance frequency is an important factor which lowers stability of detection sensitivity of the angular velocity detecting device.

In the angular velocity detecting device of Patent Document 2, since all structures are fixed to the substrate by one point which is the center of point symmetry, the above problem of Patent Document 1 does not exist. However, since the structure of the detecting device has a radial arrangement, the scale of electrodes is different when they are close to or far from the center point. Therefore, a differential detection is performed on detecting electrodes which are close to the center and those far from the center, and for example, to separate acceleration signal from angular velocity signal, a complex detecting circuit is needed. Also, since the space becomes narrower as closer to the center point and wider as farther from the center point, there are many limitations in the arrangement of the beams, vibrating body, driving electrodes, and detecting electrodes. To clear the limitations, it is necessary to make the size of the angular velocity detecting device large, which poses a needless space and bad space usability, and thus is not advantageous to make small. Moreover, since the fixation is made by one point, it is feared to have a deflection by the structure's own weight.

An object of the present invention is to provide a high-performance angular rate detecting device.

The above and other objects and novel characteristics of the present invention will be apparent from the description of this specification and the accompanying drawings.

The typical ones of the inventions disclosed in this application will be briefly described as follows.

An angular rate detecting device according to the present invention in which an x-axis in a direction on a surface of the active layer, a y-axis orthogonal to the x-axis in the surface of the active layer, and a z-axis orthogonal to the surface of the active layer are given to a substrate having formed therein a basement layer and a conductive layer (active layer) on the basement layer interposing an interlayer insulating layer in a thickness direction thereof, and a drive frame provided to the active layer so as to vibrate in the x-axis and a Coriolis frame provided so as to vibrate also in the y-axis following the vibration of the drive frame configure he angular rate detecting device. The angular rate detecting device which detects a physical quantity relating to the Coriolis force generated to the Coriolis frame when the drive frame is vibrated in the x-axis and an angular rate is applied about the z-axis comprises: at least two fixed beams (first beam) sharing a fixed end which are provided in opposite directions and extending in the y-axis direction orthogonal to the vibrating direction; a free beam (second beam) provided extending in the x-axis direction and connected to a free end of the fixed beam; and at least two supporting beams (third beams) provided to the free beam extending in the y-axis direction and having a predetermined space from the fixed beam and having a free end connected with the drive frame near the fixed end.

Further, a feature of the angular rate detecting device according to the present invention is that, the drive frame is provided inside of the Coriolis frame.

Still further, another feature the angular rate detecting device according to the present invention is that, at least two or more sets of the fixed beam, free beam and the supporting beam are arranged parallel to the fixed beam or the supporting beam with a predetermined space.

Moreover, in the angular rate detecting device according to the present invention, to reduce influence of disturbance and to further improve detection performance, at least two sensor units are provided to the active layer as a sensor unit and connected by a linking beam so that respective sensor units are interlocked (tuning-fork vibration).

The effects obtained by typical aspects of the present invention will be briefly described below.

In an angular rate detecting device according to the present invention, respective fixed beams are provided to extend toward opposite directions to each other in a detecting direction (y-axis direction) that is orthogonal to the driving direction (x-axis direction), and share a fixed end. The other end of the fixed end is coupled with the free beam provided to extend in the x-axis direction. The free beam is shorter and wider than the fixed beam and the supporting beam described later. Since the supporting beam is provided to extend in the y-axis direction with a predetermined space from the fixed beam and couples the free beam and the drive frame, the supporting beam can easily bend in the x-axis direction that is the driving direction and is hard to bend in the y-axis direction that is the detecting direction. Therefore, the drive frame vibrates easily in the x-axis direction and hardly moves in the y-axis direction.

The Coriolis frame is connected with the drive frame by a detecting beam (fourth beam) which is rigid in the x-axis direction and flexible in the y-axis direction, and thus when an angular rate around the z-axis that is orthogonal to the driving direction and the detecting direction is applied while following the vibration of the drive frame, the Coriolis frame is vibrated in the y-axis direction that is the detecting direction by the Coriolis force. Therefore, by measuring a physical quantity relating to the Coriolis force, the applied angular rate can be measured.

In the present invention, since the drive frame is levitated by the at least two fixed beams which are sharing the fixed end to vibrate, even when the substrate is deformed by mounting or fluctuation of heat, internal stress generated to the fixed beam and the supporting beam is small and influence on the detection performance is small.

And, in the angular rate detecting device according to the present invention, the drive frame is provided inside the Coriolis frame. Accordingly, a distance between fixed ends of the plurality of sets of driving beams (sets of the fixed beam, free beam, and supporting beam) which support the drive frame and the Coriolis frame can be made short, and thus influence on the detection performance is small even when the basement layer is deformed by mounting or fluctuation of heat.

Further, in the angular rate detecting device according to the present invention, at least two or more sets of the driving beams are provided with a predetermined space parallel to the fixed beam or the supporting beam. In this manner, deflection by the angular rate detecting device's own weight can be prevented, thereby enabling a high-performance detection. However, to have a plurality of sets of fixed beams means to have fixed ends locally distant to each other. When the basement layer is deformed by mounting or fluctuation of heat, to have the fixed ends distant to each other as described above poses lowering of stability because the performance of the angular rate detecting means is fluctuated by internal stress generated to the beams.

The internal stress to the beams is generated caused by strain of the substrate by mounting or heat applied to the beam as force. A simple model of a vibrating body is shown in FIG. 12, and force applied to the beam in the case where the basement layer is deformed same in the x-axis and y-axis directions respectively. With denoting a distance between the fixed ends by L, and a fluctuated distance between the fixed ends generated by deformation of the basement layer by $\Delta L$, force to be generated in the x-axis direction (driving direction) is expressed by Equation 1. And, force to be generated in the y-axis direction (detecting direction) is expressed by Equation 2.

$$Fx = (1/2) \cdot Kx \cdot \Delta L = Fy \cdot (b/L1)^2 \quad \text{(Equation 1)}$$

Where $Kx = E \cdot h \cdot b^3/L1^3 = Ky \cdot (b/L1)^2$ $$Fy = (1/2) \cdot Ky \cdot \Delta L \quad \text{(Equation 2)}$$

Where $Ky = E \cdot h \cdot b/L1$

Herein, Fx: force generated in x-axis direction, Fy: force generated in y-axis direction, E: longitudinal elastic modulus, h: height of beam, L: distance between fixed ends, $\Delta L$: displacement amount of the distance between fixed ends, L1: length of beam, Kx: spring constant in x-axis direction of beam, and Ky: spring constant in y-axis direction of beam.

According to Equation 1 and Equation 2, when the width of beam b is sufficiently smaller than the length of beam L1, $Fx \ll Fy$ holds. Therefore, in the case where a plurality of fixed ends are provided, force to be generated is smaller and influence on performance of the angular rate detecting device is smaller when the fixed ends are provided in a direction the beam is bended than in a direction the beam is extended.

According to the present invention, the sets of fixed beam, the free beam and the supporting beam (driving beams) are provided by at least two or more sets parallel to the fixed beam or the supporting beam, thereby maintaining high performance albeit a plurality of fixed ends are provided.

Moreover, in the angular rate detecting device according to the present invention, a minimum unit of angular rate detecting device is taken as one sensor unit, and at least two sensor units are provided to the active layer and coupled by a linking beam, so that respective sensor units are interlocked (tuning-fork vibration). By making the configuration in this manner, the two sensor units are capable of vibrating in reversed phases to each other, that is so-called tuning-fork vibration. By making the tuning-fork vibration, the angular rate can be detected by a differential detection on respective detecting means, and disturbance component is cancelled by the differential detection, thereby achieving a high-performance angular rate detecting device which is robust against disturbance. Further, by using the tuning-fork vibration and differential detection, an angular rate component and an acceleration component can be separated, thereby enabling acceleration detection at the same time.

BRIEF DESCRIPTIONS OF THE DRAWINGS

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. The same goes for the numerical value and the range described above.

Also, components having the same function are denoted by the same reference symbols throughout the drawings for describing the embodiments, and the repetitive description thereof is omitted. Also, hatching is used even in a plan view so as to make the drawings easy to see.

First Embodiment

Figure 1:
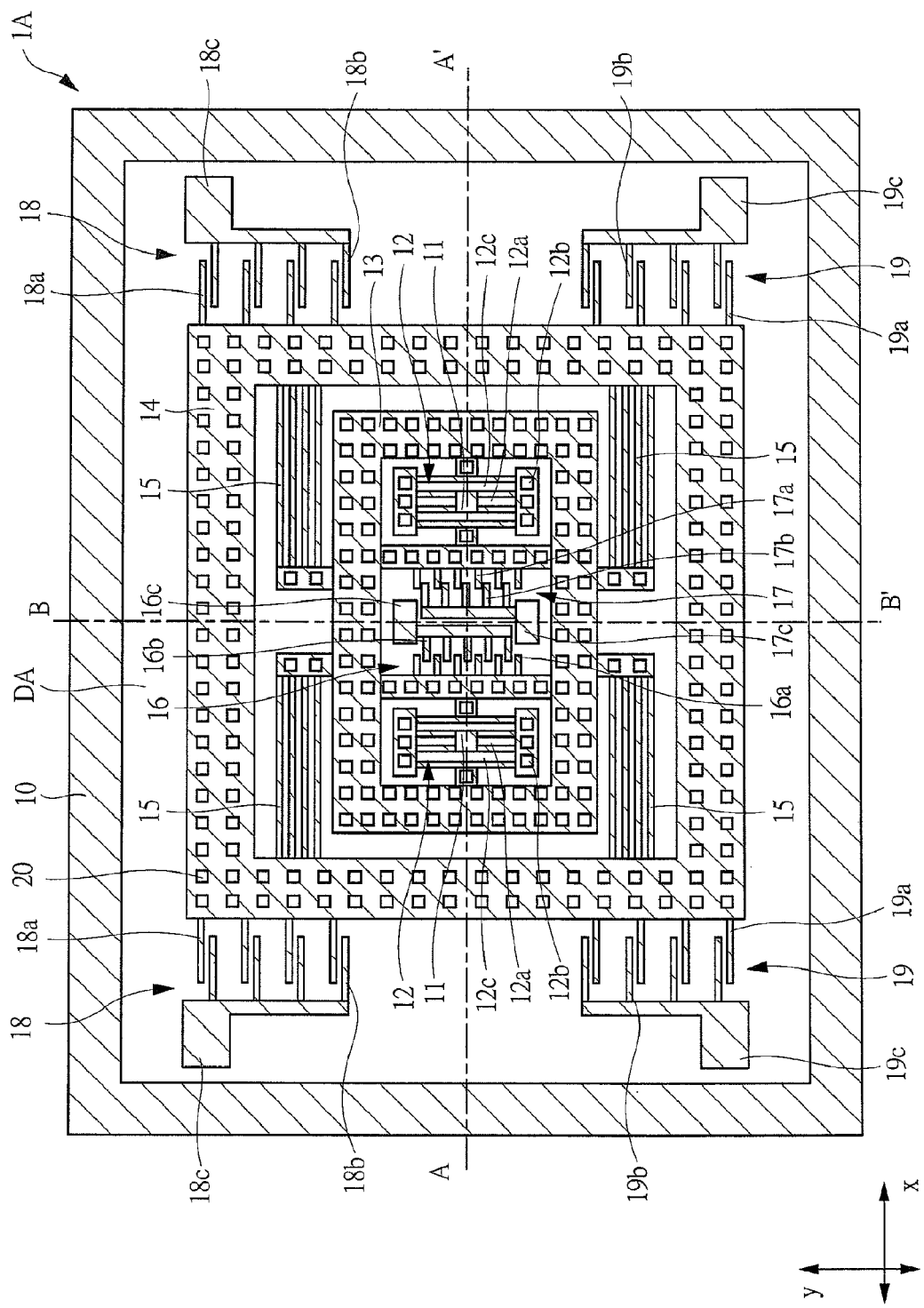
FIG. 1 is a planer view showing a configuration of an angular rate detecting device according to a first embodiment of the present invention.
Figure 2:
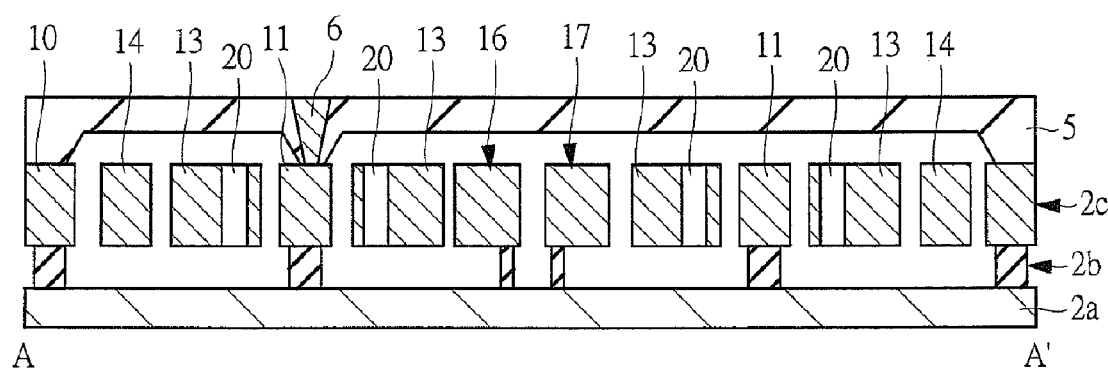
FIG. 2 is a cross-sectional view showing a cross section of FIG. 1 taken along the line A-A'.
Figure 3:
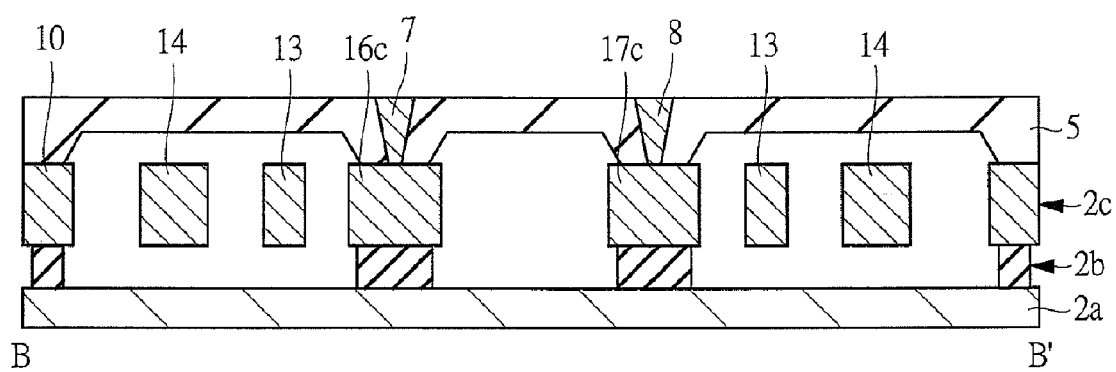
FIG. 3 is a cross-sectional view showing a cross section of FIG. 1 taken along the line B-B'.

An angular rate detecting device according to a first embodiment of the present invention will be described with reference to FIG. 1 to FIG. 3. FIG. 1 is a schematic planer view showing main components of an angular rate detecting device 1A according to a first embodiment of the present invention. FIG. 2 is a cross-sectional view showing a cross section of FIG. 1 taken along the line A-A'. FIG. 3 is a cross-sectional view showing a cross section of FIG. 1 taken along the line B-B'.

First, a configuration of the angular rate detecting device 1A according to the first embodiment of the present invention will be described. To the angular rate detecting device 1A, for example, an SOI (Silicon on Insulator) substrate is used. More particularly, the SOI substrate has a basement layer 2a, an interlayer insulating layer 2b formed on the basement layer 2a, and a conductive layer (active layer) 2c formed on the interlayer insulating layer 2b. The basement layer 2a is formed of, for example, silicon (Si), and the interlayer insulating layer 2b is formed of, for example, silicon oxide ($SiO_2$). And, the conductive layer 2c formed on the interlayer insulating layer 2b is formed of, for example, conductive silicon.

A total thickness of the basement layer 2a and the interlayer insulating layer 2b is, for example, several tens to several hundreds of µm, and a thickness of the conductive layer 2c is, for example, several µm to several tens of µm. While an SOI substrate is used in the first embodiment, the semiconductor substrate is not limited to an SOI substrate, and various modifications can be applied. For example, conductive polycrystalline silicon using a surface MEMS technology, or, for example, a plated metal such as nickel (Ni) may be used for the conductive layer.

The interlayer insulating layer 2b is formed on the basement layer 2a, and the conductive layer 2c is formed on the interlayer insulating layer 2b. The conductive layer 2c is processed so that a pedestal part 10 is formed so as to surround a device formation area DA, and components to be described below are formed inside of the pedestal part 10.

In the device formation area DA surrounded by the pedestal part 10, a fixed part 11 is formed by patterning the active layer 2c. The fixed part 11 is fixed to the basement layer 2a via the interlayer insulating layer 2b. And, a driving beam 12 supporting a drive frame 13 to be described later is connected to the fixed part 11.

The driving beams 12 are provided to extend in opposite directions to each other in the y-axis direction that is orthogonal to the driving direction, and have the fixed part 11 as a shared end. The driving beam 12 comprises: at least two fixed beams (first beams) 12a which are flexible in the x-axis direction that is the driving direction and rigid in the y-axis direction which is the detecting direction; a free beam (second beam) 12b which is provided at the other end of the fixed beam 12a to extend in the x-axis direction and is hard to deform in both the x-axis direction and y-axis direction; and at least two supporting beams (third beams) 12c which are provided parallel with the free beam 12b and the fixed beam 12a with a predetermined space and are flexible in the driving direction and rigid in the detecting direction.

The fixed beam 12a is provided to extend in the y-axis direction in pairs symmetrically across the fixed part 11. One end of the fixed beam 12a is coupled with the fixed part 11, and the other end of the fixed beam 12a is coupled with the free beam 12b. And, the supporting beam 12c is provided to extend in pairs in the y-axis direction symmetrically across a connecting part (which is coupled with the drive frame 13 on the same x-axis direction with the fixed part 11), and one end of the supporting beam 12c is coupled with the free beam 12b and the other end is coupled with the connecting part. Further, two sets of the fixed part 11 and the driving beam 12 are formed in the x-axis direction and on the x-axis with a predetermined space therebetween.

The drive frame 13 has a rectangular planer shape. The drive frame 13 supported by the driving beam 12 which is flexible in the driving direction and rigid in the detecting direction. By removing the interlayer insulating layer 2b provided under the drive frame 13, the drive frame 13 is suspended to the fixed part 11 with a distance from the basement layer 2a.

Figure 4:
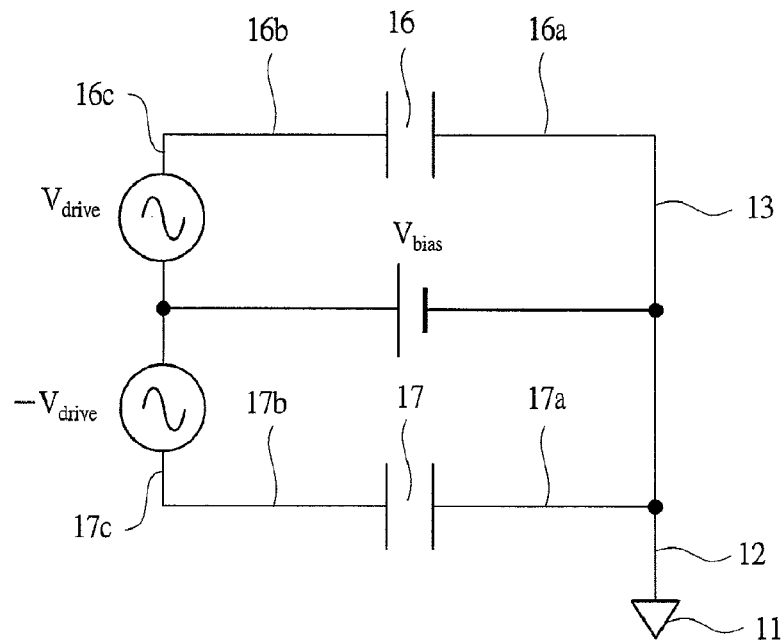
FIG. 4 is a conceptual diagram of a drive circuit according to the first embodiment.

Drive means 16, 17 comprise: movable driving electrodes 16a, 17a; fixed driving electrodes 16b, 17b fixed to the basement layer 2a via the interlayer insulating layer 2b; and pads 16c, 17c. By using the drive means 16, 17, the drive frame 13 is vibrated in the driving direction. The mechanism of the vibration and a vibration circuit etc. are shown in FIG. 4 and will be described later.

A Coriolis frame 14 is formed by processing the active layer 2c and has a rectangular planer shape. The Coriolis frame 14 is connected to the drive frame 13 by at least four detecting beams 15 that are rigid in the x-axis direction which is the driving direction, and flexible in the y-axis direction which is the detecting direction. Therefore, the Coriolis frame 14 vibrates in the driving direction following the vibration of the drive frame 13 in the x-axis direction with same amplitude and phase with those of the drive frame 13.

Figure 5:
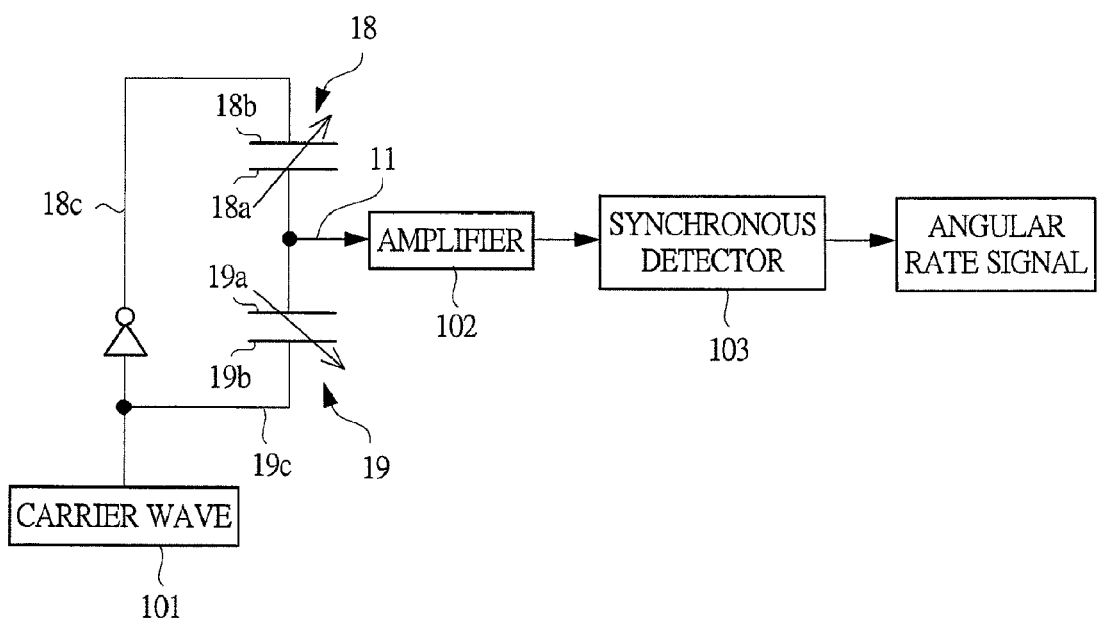
FIG. 5 is a conceptual diagram of a detecting circuit according to the first embodiment.

Detecting means 18, 19 comprises: movable detecting electrodes 18a, 19a connected to the Coriolis frame 14; fixed detecting electrodes 18b, 19b fixed to the basement layer 2a via the interlayer insulating layer 2b; and pads 18c, 19c. And, a detection circuit is shown in FIG. 5 and will be described later.

More specifically, the fixed components formed to the conductive layer (active layer) 2c such as the pedestal part 10, the fixed part 11, fixed driving electrodes 16b, 17b of the drive frames 16, 17, the fixed detecting electrodes 18b, 19b of the detecting means 18, 19, and the pads 16c, 17c, 18c, 19c are fixed to the basement layer 2a via the interlayer insulating layer 2b formed to a lower layer.

On the other hand, these movable components such as the drive frame 13, the Coriolis frame 14, and the beams 12, 15 are suspended to the fixed part 11 by removing the interlayer insulating layer 2b formed to the lower layer. Therefore, the movable components are configured so as to be displaced in the plane of the conductive layer (active layer) 2c parallel with a main surface of the SOI substrate (basement layer 2a).

As shown in FIG. 2 and FIG. 3, a cap 5 is bonded on the pedestal part 10 so as to cover the device formation area DA of the angular rate detecting device 1A. The cap 5 is formed of, for example, a glass substrate, and bonded with the pedestal part 10 formed of silicon by anodic bonding. Further, through-electrodes 6, 7, 8 are formed at portions where the pads 16c, 17c, 18c, 19c are bonded, so as to enable communication of electric signals with the external of the device.

The angular rate detecting device according to the first embodiment is configured as described above, and next, features of the present invention will be described.

As shown in FIG. 1, there are provided: at least two fixed beams 12a provided to extend opposite to each other in the detecting direction (y-axis direction) that is orthogonal to the vibrating direction and sharing the fixed part 11 as fixed end, and are flexible in the x-axis direction that is the driving direction and rigid in the y-axis direction that is the detecting direction; the free beam 12b provided at the other end of the fixed beam 12a to extend in the x-axis direction and hardly deforms in both the x-axis direction and the y-axis direction; and at least two supporting beams provided to the free beam 12b parallel with the fixed beam 12a with a predetermined space and flexible in the driving direction and rigid in the detecting direction, the beams are coupled with the drive frame 13 near the fixed part 11.

By making such a configuration in this manner, all the movable components including the drive frame 13 and the Coriolis frame 14 are fixed to the basement layer 2a via the interlayer insulating layer 2b by one point (two points arranged in line on the x-axis in the first embodiment) of the fixed part 11. Therefore, it is possible to solve the problems of the conventional angular rate (velocity) detecting device such as the mounting strain or generation of internal stress of the driving beam 12 and detecting beam 15 due to changes in peripheral environment (heat), and performance lowering of the angular rate detecting device.

While it is ideal to apply one-point support as described above, in the case of one-point support, influences from the size of the angular rate detecting device, the thickness of the active layer 2c, and force of gravity on the active layer 2c may cause deflection of the drive frame 13 or the Coriolis frame 14 in the thickness direction (z-axis direction) of the active layer 2c. This deflection means displacements of the movable detecting electrodes 18a, 19a and the fixed detecting electrodes 18b, 19b of the detecting means 18, 19, and it is one factor of performance deterioration of the angular rate detecting device such that output is generated despite there is no input of angular rate, i.e., offset.

Therefore, it is necessary to arrange a plurality of driving beams 12 so as to prevent deflections of the drive frame 13 and the Coriolis frame 14. However, as it can be found from Equation 1 and Equation 2 above, to arrange a plurality of fixed parts 11 in the y-axis direction that is the detecting direction with a predetermined space has large influences on the performance of angular rate detection because, when the basement layer 2a is deformed, the internal stress to be generated to the driving beams 12 is large according to arranging the plurality of fixed parts 11 in the x-axis direction that is the driving direction with a predetermined space.

Therefore, according to the first embodiment, two fixed parts 11 are arranged on the line of the x-axis that is the driving direction. As a result, it is possible to form a high-performance and high-stability angular rate detecting device having small influences on the performance due to deformations of the movable parts and the substrate.

Next, an operation of the angular rate detecting device 1A according to the first embodiment will be described. In FIG. 1, the drive frame 13 is vibrated in the x-axis direction that is the driving direction with a constant amplitude and a constant frequency by the driving means 16, 17.

FIG. 4 shows a drive circuit which drives such the driving means 16, 17. Note that, in FIG. 4, the driving means 16, 17 are denoted by capacitors, and the drive frame 13 and the driving beam 12 are denoted by wirings, and they are applied with same symbols as an equivalent circuit of this figure. And, the symbol $V_{bias}$ denotes a DC bias voltage to be applied to the drive frames 16, 17, and the symbol $V_{drive}$ denotes an AC driving signal to be applied to the drive frames 16, 17. By applying this AC driving signal properly, it is possible to vibrate the drive frame 13 of the angular rate detecting device 1A in the x-axis direction which is the driving direction. Although not shown here, a method to provide an electrode to monitor the amplitude of the drive frame 13, so that the size of the AC driving signal is adjusted according to the result and the driving amplitude become constant, and a driving method to make the driving frequency follow fluctuations of a resonance frequency occurring due to changes in peripheral environment by using a self-excited oscillator have been known.

When an angular rate around the z-axis that is perpendicular to the plane of paper in a state where the drive frame 13 is vibrated with a constant frequency and a constant amplitude by the driving means 16, 17, the Coriolis force Fc shown by Equation 3 is generated in the detecting direction (y-axis direction) orthogonal to the driving direction (x-axis direction) to the vibrating drive frame 13 and the Coriolis frame 14 connected to the drive frame 13.

$$Fc = 2 \cdot my \cdot \Omega \cdot X \cdot \omega \cdot \cos(\omega \cdot t) \quad \text{(Equation 3)}$$

Here, Fc: the Coriolis force, my: weight of the Coriolis device, $\Omega$: applied angular rate, X: maximum amplitude in driving direction, $\omega$: driving frequency, and t: time.

Since the drive frame is supported by the beams 12a, 12c which are flexible in the driving direction and rigid in the detecting direction, it hardly moves in the detecting direction. On the other hand, since the Coriolis frame 14 is supported by the detecting beam 15 which is flexible in the detecting direction, it is easily displaced in the detecting direction by the Coriolis force Fc. According to this displacement, distances between the movable electrodes 18a, 19a and the fixed detecting electrodes 18b, 19b are fluctuated, thereby changing the capacitance. By detecting the change in capacitance of the detecting electrodes 18, 19 which is changed proportional to the applied angular rate, the applied angular rate can be measured.

FIG. 5 shows a detection circuit for extracting angular rate signals from the detecting means 18, 19. A carrier wave 101 which have phases different by 180° to each other are respectively applied to the detecting means 18, 19, and a difference thereof is amplified by an amplifier 102 and synchronously detected by a synchronous detecting circuit 103, thereby outputting the wave as a voltage signal proportional to the applied angular rate. For example, although not shown, it has been know that, in the case where means to measure the amplitude of the drive frame 13 is used, a carrier wave having a different frequency from that of the carrier wave 101 is applied and a synchronous detection is performed by the applied frequency so that signals are distinguished. And, it is possible to detect the applied angular rate by providing an electrode to negate the generated Coriolis force by rebalancing force to the Coriolis frame 14 to monitor a voltage to be applied to the electrode. Note that, in FIG. 5, the detecting means 18, 19 are denoted by capacitors, and the fixed part 11 is denoted by a wiring. Same symbols are applied as an equivalent circuit of FIG. 5.

Next, a method of manufacturing the angular rate detecting device 1A according to the first embodiment will be described with reference to the attached figures. First, as shown in FIG. 6, the pedestal part 10, fixed part 11, driving beam 12, drive frame 13, Coriolis frame 14, detecting beam 15, driving means 16, 17, detecting means 18, 19, and an etch hole 20 (these are functional parts) are formed to the conductive layer 2c of the SOI substrate by using a photolithography technology and an etching technology.

Figure 7:
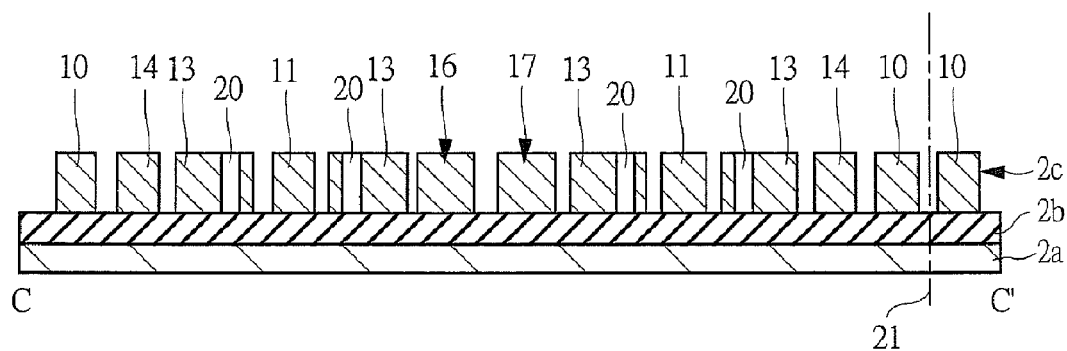
FIG. 7 is a cross-sectional view showing a cross section of FIG. 6 taken along the line C-C'.

To form these functional parts, first, as shown in FIG. 7, the interlayer insulating layer 2b is formed on the basement layer 2a to prepare the SOI substrate having the conductive layer 2c formed on the interlayer insulating layer 2b. And, part of the conductive layer 2c other than the functional parts to be formed is removed by using a photolithography technology and an etching technology, thereby forming the functional parts. In this manner, the fixed part 11, driving beam 12, drive frame 13, Coriolis frame 14, detecting beam 15 etc. which configure the functional parts are provided to a same layer.

Figure 8:
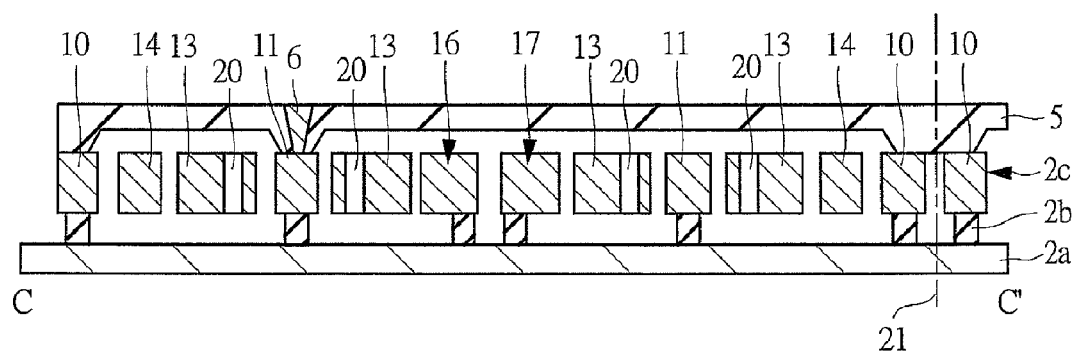
FIG. 8 is a cross-sectional view showing a manufacturing process of the angular rate detecting device continued from FIG. 7.

Subsequently, as shown in FIG. 8, the interlayer insulating layer 2b formed as a lower layer of the movable parts (driving beam 12, drive frame 13, Coriolis frame 14, detecting beam 15) is removed by etching, so that the movable parts are suspended to the fixed part 11. According to this process, the movable parts which can be displaced can be formed.

Figure 6:
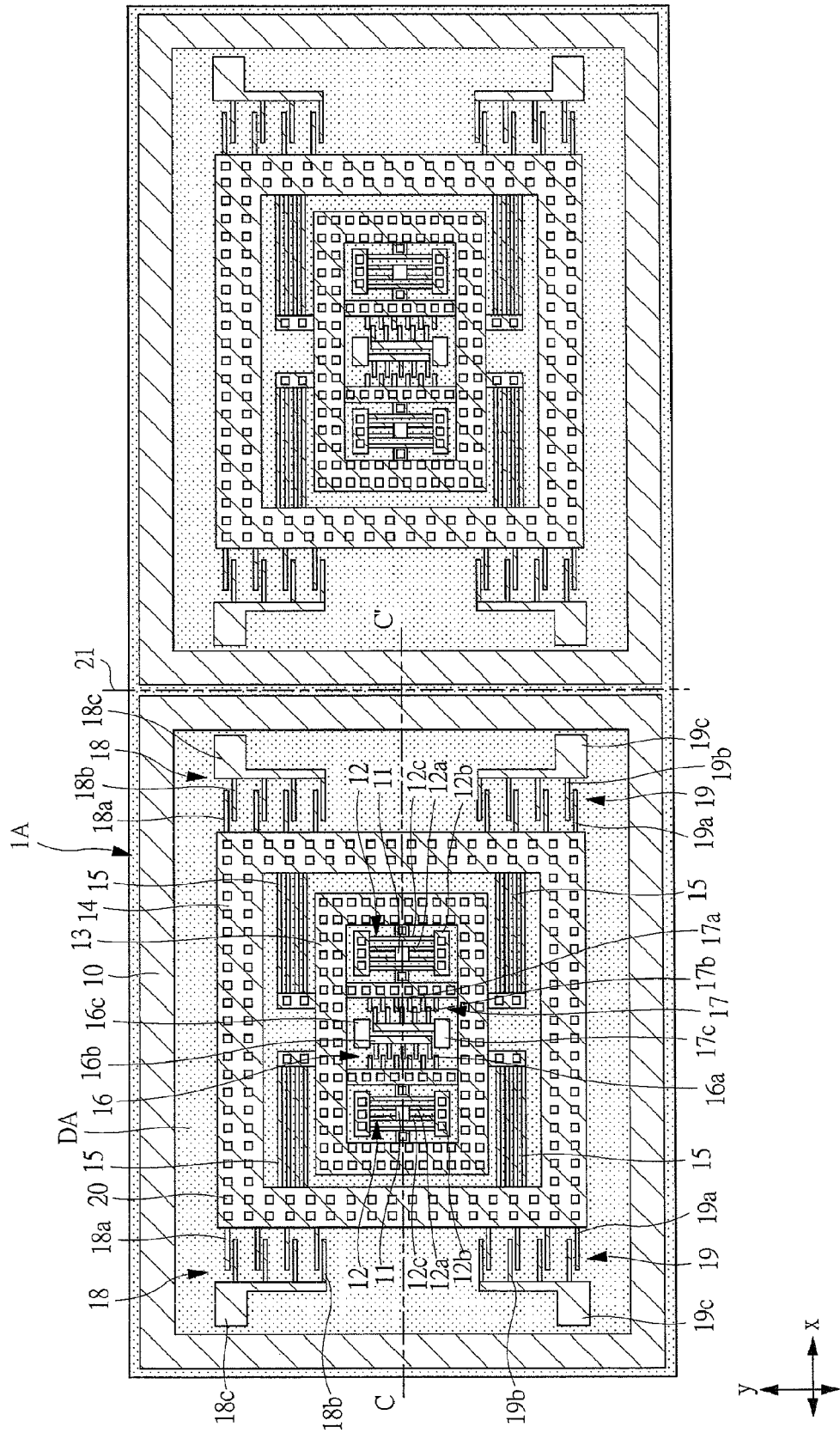
FIG. 6 is a planer view showing a manufacturing process of the angular rate detecting device according to the first embodiment.

The etch hole 20 is formed in the drive frame 13 and the Coriolis frame 14 so as to penetrate the conductive layer 2c and shown in FIG. 6 and FIG. 7. Therefore, an etching gas or an etching solution reaches to the interlayer insulating layer 2b through the etch hole 20 when removing the conductive layer 2c, thereby separating the Coriolis frame 14 from the basement layer 2a.

Accordingly, a maximum etching width of the interlayer insulating layer 2b is a length between two etch holes 20 formed in a direction at 45° to the x-axis or the y-axis of the conductive layer 2c, and thus it is necessary to make the fixed part 11 longer than the length. In consideration of process variations, the fixed part 11 is preferably two to several times larger than the length. Also, in the case where an electrode 6 is formed via the cap 5 as shown in FIG. 2 and FIG. 8, it is necessary to make the size of the fixed part 11 suitable (several hundreds of µm).

Figure 11:
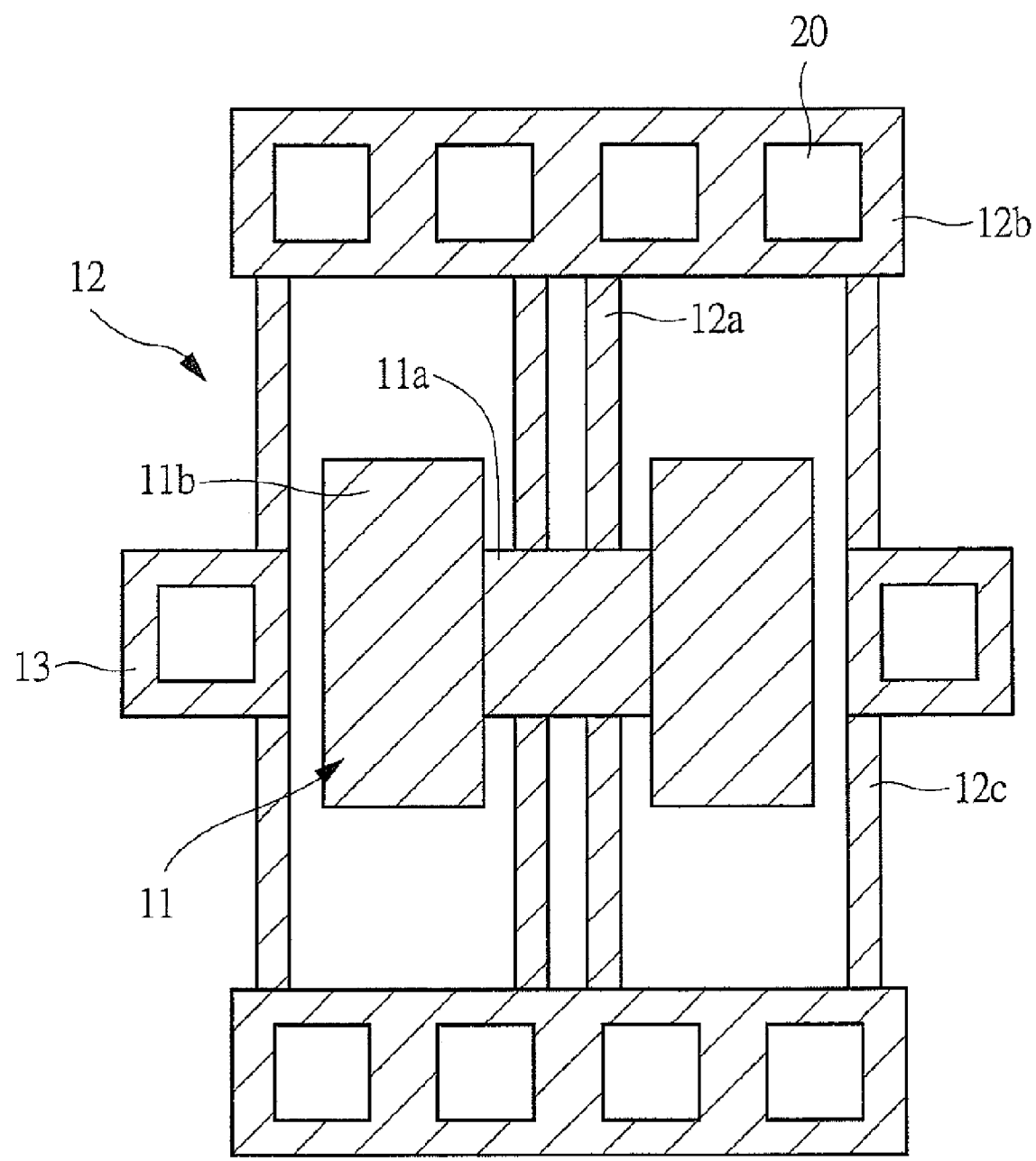
FIG. 11 is a conceptual diagram of a driving beam and a fixed part.
Figure 12A:
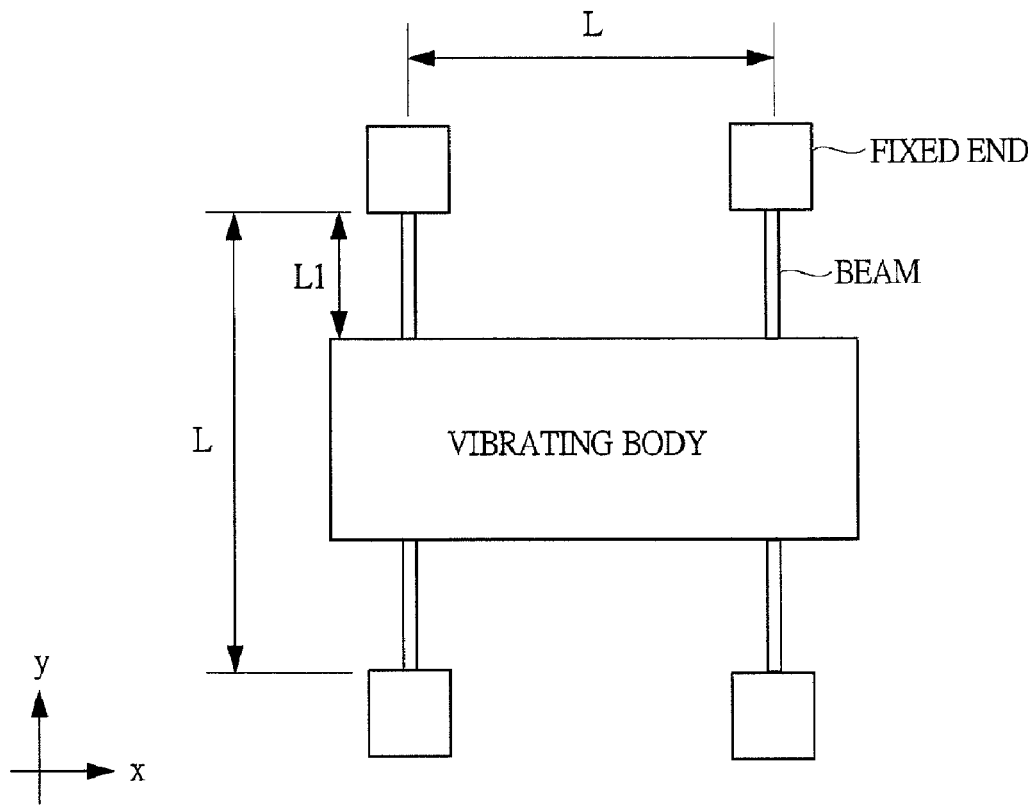
FIG. 12 is a diagram of a model of a vibrating body and a beam supporting the vibrating body.
Figure 12B:
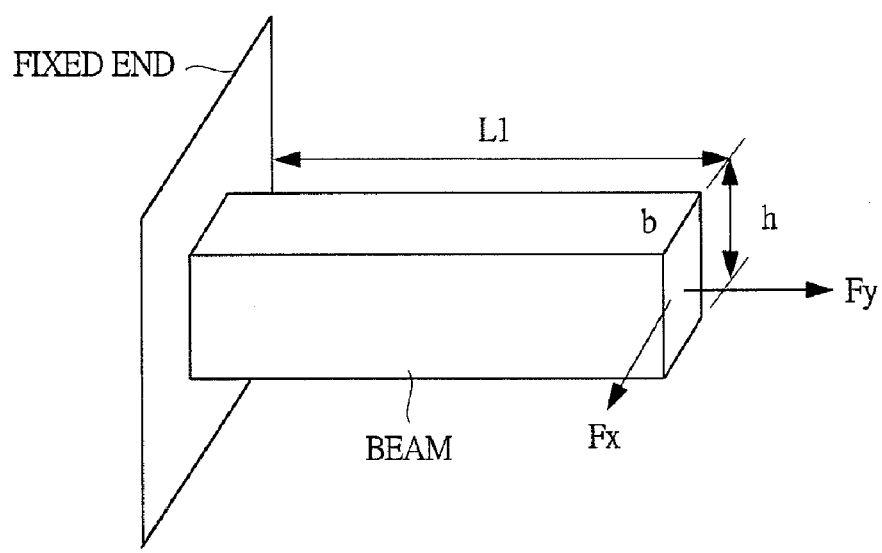

However, as described by Equation 1 and Equation 2, enlargement of the fixed part 11 in the y-axis direction which is the detecting axis has a limitation to balance it with the performance of the sensor. In this case, a fixation as shown in FIG. 11 (part of the driving beam 12 and the drive frame 13 is shown) can be used. At this time, the width in the detecting direction of the fixed part 11 coupled with the fixed beam 12a is not influenced by the size required for forming the electrode 6.

Note that, although not shown in FIG. 8, the interlayer insulating layer 2b formed as a lower layer of the movable driving electrodes 16a, 17a of the driving means 16, 17 and the movable detecting electrodes 18a, 19a of the detecting means 18, 19 is also removed, thereby also suspending the driving electrode on the space. The interlayer insulating layer 2b formed as a lower layer of other structures are not removed. In this manner, structures other than the movable parts and the movable electrodes can be fixed (coupled) to the basement layer 2a via the interlayer insulating layer 2b.

Subsequently, as shown in FIG. 2, FIG. 3, and FIG. 8, the cap 5 having predetermined electrodes 6, 7, 8 (a plurality of pieces, not shown) is mounted on the structure of the angular rate detecting device. At this time, the electrodes 6, 7, 8 are aligned so as to overlap the fixed part 11 and the plurality of pads 16c, 17c, 18c, 19c. It means that the predetermined electrodes formed to the cap 5 are electrically connected to the fixed part 11 and the plurality of pads 16c, 17c, 18c, 19c. In this manner, even after the cap 5 has been formed, the pads can be electrically connected to the external integrated circuits by wires or the like.

And, as shown in FIG. 2, FIG. 3 and FIG. 8, the cap 5 is formed so as to be bonded on the pedestal part 10. This cap 5 is formed so as to cover the device formation area DA, and the device formation area DA in which the structure of the angular rate detecting device is formed is sealed air-tight by the cap 5.

Although a glass substrate is used for the cap 5 in the first embodiment, substrates made of other materials such as a silicon substrate can be used. Further, although an example where the cap 5 and the pedestal part 10 are bonded by anodic bonding has been described, room temperature bonding which uses surface activation by plasma and ion, and a bonding made by using adhesives such as glass frit and solder to bond the cap 5 and the pedestal part 10 can be applied.

For example, by using a silicon substrate as the cap 5, the cap 5 and the pedestal part 10 can be bonded by room temperature bonding. Since the cap 5 and the pedestal part 10 are made of a same material at this time, sealing strain due to a difference of temperature expansion coefficient between sealing materials can be eliminated, thereby obtaining a high-performance angular rate detecting device.

Subsequently, as shown in FIG. 8, the individual angular rate detecting devices 1A are divided by dicing the basement layer 2a bonded with the cap 5 along a dicing line 21. In this manner, the angular rate detecting device 1A according to the first embodiment can be formed.

Second Embodiment

Figure 9:
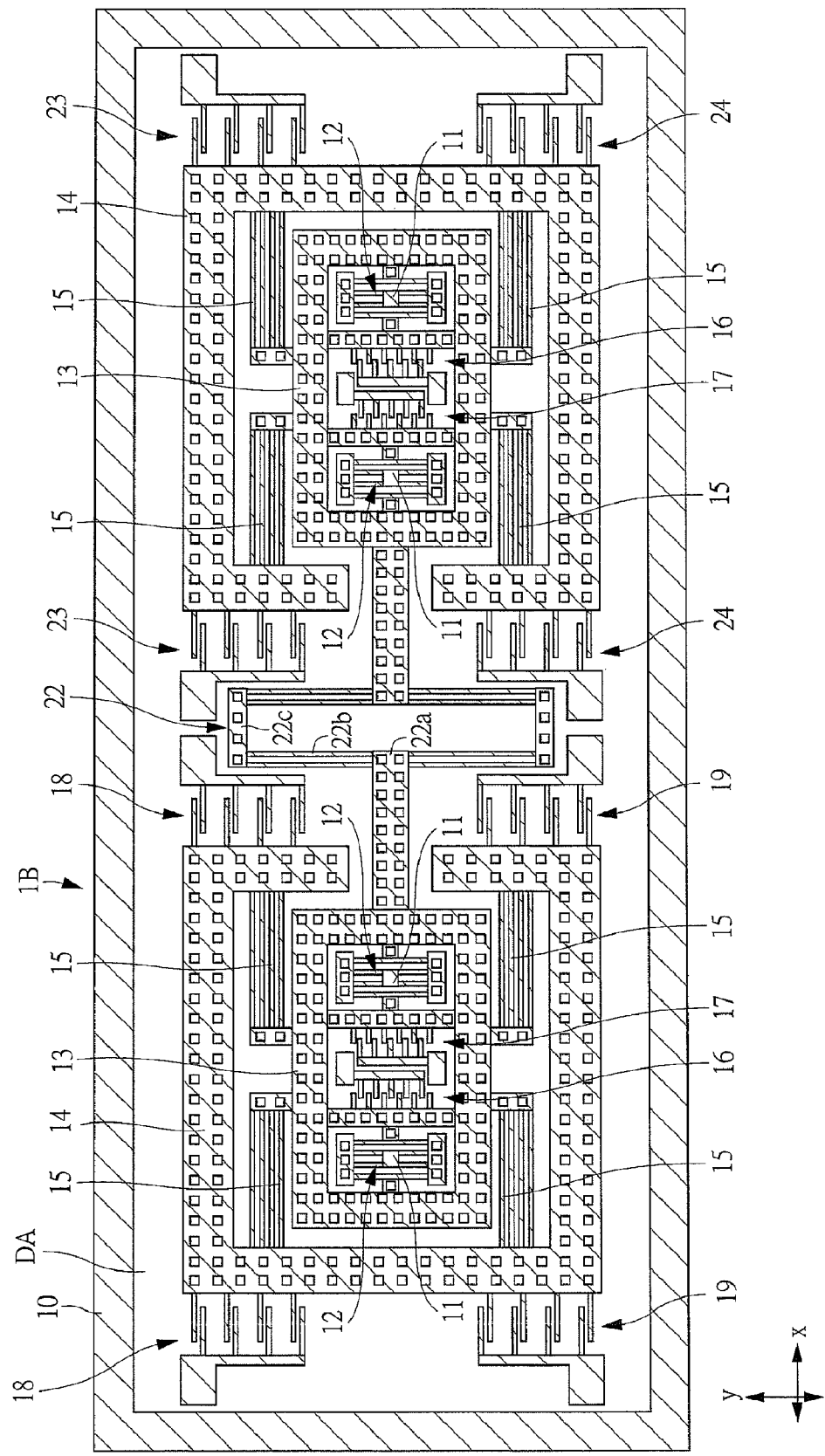
FIG. 9 is a planer view showing a configuration of an angular rate detecting device according to a second embodiment of the present invention.

In a second embodiment of the present invention, an angular rate detecting device 1B according to the second embodiment will be described with reference to figures in the same manner as the first embodiment. FIG. 9 is a planer schematic diagram showing main components of the angular rate detecting device 1B according to the second embodiment.

A method of manufacturing the angular rate detecting device 1B according to the second embodiment is similar to that of the angular rage detecting device 1A according to the first embodiment. Different points from the first embodiment are the configuration of the angular rate detecting device 1B, and there are arranged two angular rate detecting device 1A described in the first embodiment in the driving direction and the drive frames 13 which are linked by a linking part 22 to each other in the second embodiment. Therefore, the two angular rate detecting devices are interlocked with each other and make tuning-fork vibration.

First, while the configuration of the angular rate detecting device 1B according to the second embodiment will be described with reference to FIG. 9, the second embodiment has two angular rate detecting devices of the first embodiment 1 arranged in the driving direction as mentioned above. Therefore, descriptions same as those in the first embodiment will be omitted, and the following descriptions will be concentrated on newly added parts.

In FIG. 9, an SOI (Silicon on Insulator) substrate is used for the angular rate detecting device 1B same as the first embodiment. As shown in FIG. 2 and FIG. 3, the pedestal part 10 is formed so as to surround the device formation area DA by processing the conductive layer 2c, and components are formed inside the pedestal part 10.

First, in the device formation area surrounded by the pedestal part 10, the fixed part 11 is formed. And, the driving beam 12 same as the first embodiment is connected to the fixed part 11 so that the drive frame 13 is suspended.

The drive frame 13 is suspended by the driving beam 12 and comprises the driving means 16, 17. And, the two drive frames 13 are each coupled with the linking part 22 which is flexible in the x-axis direction that is the driving direction and rigid in the y-axis direction that is the detecting direction. The linking part 22 comprises a coupling part 22a extending in the driving direction from the drive frame 13, at least four linking beams 22b which are flexible in the driving direction and rigid in the detecting direction, and a link 22c for connecting the linking parts 22. The link 22c is formed to be wider than the linking beam 22b so as not to deform as much as possible.

The driving means 16, 17 make tuning-fork vibration of the drive frame 13 in the driving direction. More particularly, by using the drive circuit shown in FIG. 4, respective drive frames 13 are vibrated by reversed phases to be close/far to/from each other.

The Coriolis frame 14 is connected to the drive frame 13 by at least four detecting beams 15 which are rigid in the x-axis direction that is the driving direction and flexible in the y-axis direction that is the detecting direction. Therefore, the Coriolis frame 14 is vibrated following the vibration of the drive frame 13 in the x-axis direction with the same amplitude and same phase with those of the drive frame 13. Accordingly, when an angular rate around the z-axis is applied, the Coriolis frames 14 also vibrate in reversed phases to each other by a vibrational frequency of the drive frame 13.

Figure 10:
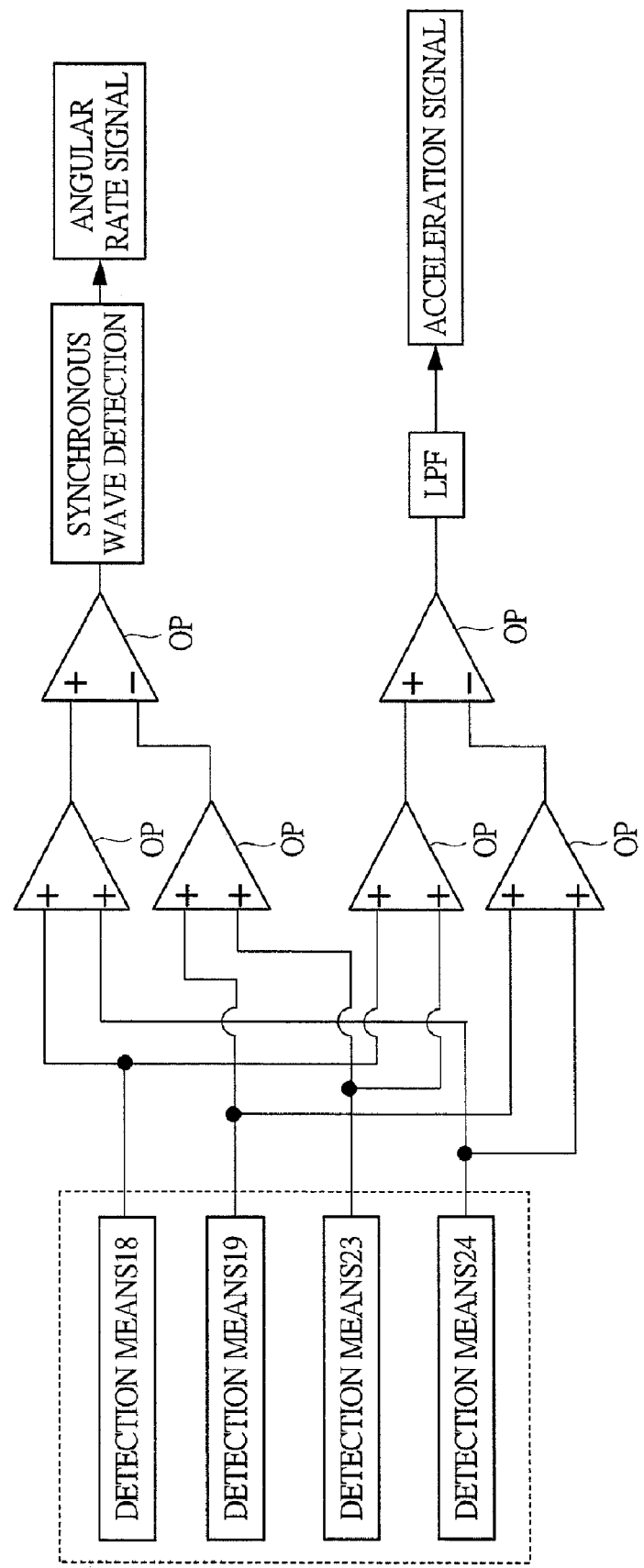
FIG. 10 is a conceptual diagram of a detecting circuit according to the second embodiment.

The detecting means 18, 19, 23, 24 detect the movement of the Coriolis frame 14 by using a detecting circuit shown in FIG. 10. As described in the foregoing, the Coriolis frames 14 are vibrated in reversed phases to each other according to the applied angular rates. However, when an acceleration rate is applied, they are vibrated in the same direction, i.e., same phase. Therefore, angular rate and acceleration rate can be separately detected respectively at the same time by a known detecting method.

FIG. 10 schematically shows a method for detecting values of acceleration rate and angular rate from changes in capacitance obtained by such the detecting means 18, 19, 23, 24. The symbol OP denotes an operational amplifier. More particularly, the applied angular rate can be detected by taking a difference between a value of added capacitances of the detecting means 18 and the detecting means 23 and a value of added capacitances of the detecting means 19 and the detecting means 24. Also, the acceleration rate applied in the detecting direction can be detected by taking a difference between the value of added capacitances of the detecting means 18 and the detecting means 23 and the value of added capacitances of the detecting means 19 and the detecting means 24.

A feature of the second embodiment is to apply the driving beam 12 to the tuning-fork type angular rate detecting device 1B. In this manner, as same with the first embodiment, it is possible to achieve an angular rate detecting device which gets small influence to the detecting performance even when the basement layer is deformed due to mounting strain or fluctuation of peripheral environment like heat.

Subsequently, as same with the first embodiment, the cap 5 having predetermined electrodes is mounted on the structure of the angular rate detecting device 1B. At this time, the electrodes are aligned so as to overlap the fixed part 11 and the pads of the driving means 16, 17 and the detecting means 18, 19. In other words, the predetermined electrodes formed to the cap 5 are electrically connected with the fixed part 11 and the plurality of pads. In this manner, even after the cap 5 is formed, the pads can be electrically connected to external integrated circuits by wires and the like. And, the cap 5 is bonded on the pedestal part 10 so as to cover the device formation area DA, so that the device formation area DA in which the structure of the angular rate detecting device is formed is sealed air-tight by the cap 5.

Subsequently, as same with the first embodiment, the basement layer 2a to which the cap 5 is bonded is diced, thereby dividing the individual angular rate detecting devices 1B. In this manner, the angular rate detecting device 1B according to the second embodiment can be formed.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, while the cases where a drive frame is provided inside a Coriolis frame has been described in the above embodiments, they can be applied to the case where a drive frame is provided outside a Coriolis frame.

The present invention is widely applicable to inertial force detecting device such as an acceleration sensor and an angular rate sensor, and manufacturing industry for manufacturing vibrating micro-electro-mechanical devices such as a vibrator/oscillator and a mechanical filter.

What is claimed is:

1. An angular rate detecting device in which an x-axis direction on a surface of an active layer, a y-axis direction perpendicular to the x-axis direction on the surface of the active layer, and a z-axis direction perpendicular to the surface of the active layer are given to a substrate having a basement layer and the active layer on the basement layer interposing an interlayer insulating layer formed in a thickness direction; and wherein a drive frame provided on the active layer so as to vibrate in the x-axis direction and a Coriolis frame provided so as to vibrate also in the y-axis direction following the vibration of the drive frame configure the angular rate detecting device for detecting a physical amount relating to a Coriolis force generated to the Coriolis frame when an angular rate about the z-axis direction is applied, the angular rate detecting device comprising:
at least two fixed beams provided to extend in opposite directions in the y-axis direction orthogonal to the vibrating direction and substrate by a fixed end between said fixed beams;
at least two free beams provided to extend in the x-axis direction and each coupled with a free end of at least a respective one of said fixed beams; and
at least two supporting beams extending in the y-axis direction with predetermined spaces from said fixed beams, wherein each of said supporting beams has one end coupled with a respective one of the free beams and another end coupled with the drive frame near the fixed end.

2. The angular rate detecting device according to claim 1, wherein the drive frame is provided inside the Coriolis frame.

3. The angular rate detecting device according to claim 1, wherein at least two or more sets of said fixed beams, said free beams, and said supporting beams are provided in the x-axis direction with predetermined spaces therebetween.

4. An angular rate detecting apparatus having the angular rate detecting device of claim 1 as one unit of a sensor unit, and at least two such sensor units are provided on the active layer and coupled by a linking beam, so that said sensor units are interlocked.

5. The angular rate detecting device according to claim 1, wherein the fixed end is shared by said fixed beams.

6. An angular rate detecting device comprising:
a basement layer;
an interlayer provided on the basement layer;
a fixed part provided on the interlayer;
a drive frame provided on the same layer as the fixed part and suspended to from the fixed part via a first beam, a second beam, a third beam, and a connecting part; and
a Coriolis frame provided on the same layer as the fixed part and suspended from the fixed part via a fourth beam,
wherein, when a direction on a surface of the basement layer is taken as an x-axis direction and a direction perpendicular to the x-axis direction on the surface of the basement layer is taken as a y-axis direction,
the first beam is provided to extend in the y-axis direction;
the second beam is provided to extend in the x-axis direction;
the third beam is provided to extend in the y-axis direction with a predetermined space from the first beam;
one end of the first beam is coupled with the fixed part and another end of the first beam is coupled with the second beam;
one end of the third beam is coupled with the second beam, and another end of the third beam is coupled with the connecting part; and
the connecting part extends in the x-axis direction and the connecting part is coupled with the drive frame.

7. The angular rate detecting device according to claim 6, further comprising an additional first beam, an additional second beam, and an additional third beam,
wherein the additional first beam is provided to extend in the y-axis direction;
the additional second beam is provided to extend in the x-axis direction;
the additional third beam is provided to extend in the y-axis direction with a predetermined space from the additional first beam;
one end of the additional first beam is coupled with the fixed part and another end of the additional first beam is coupled with the additional second beam;
one end of the additional third beam is coupled with the additional second beam and another end of the additional third beam is coupled with the connecting part;
the first beam and the additional first beam are provided to extend in the y-axis direction symmetrically across the fixed part, and
the third beam and the additional third beam are provided to extend in the y-axis direction symmetrically across the connecting part.

8. The angular rate detecting device according to claim 6, wherein a planar shape of the drive frame is a rectangular shape, and the fixed part, the first beam, the second beam, the third beam, and the connecting part are provided inside the rectangular shape.

9. The angular rate detecting device according to claim 6, wherein a planar shape of the Coriolis frame is a rectangular shape, and the drive frame is provided inside the rectangular shape.

10. The angular rate detecting device according to claim 6, wherein a length of the second beam is smaller than a length of the first beam, and
a width of the second beam is larger than a width of the first beam.

* * * * *